US011122935B2

(12) United States Patent
Hsu

(10) Patent No.: US 11,122,935 B2
(45) Date of Patent: Sep. 21, 2021

(54) CERAMIC DEEP-FRYING DEVICE CAPABLE OF WITHSTANDING HIGH TEMPERATURES AND RELEASING FAR-INFRARED ENERGY AND METHOD FOR MAKING THE SAME

(71) Applicants: Chun-Shyong Lee, New Taipei (TW); Sen-Kung Hsu, New Taipei (TW)

(72) Inventor: Sen-Kung Hsu, New Taipei (TW)

(73) Assignees: Chun-Shyong Lee, New Taipei (TW); Sen-Kung Hsu, New Taipei (TW)

(*) Notice: Subject to any disclaimer, the term of this patent is extended or adjusted under 35 U.S.C. 154(b) by 523 days.

(21) Appl. No.: 15/991,069

(22) Filed: May 29, 2018

(65) Prior Publication Data
US 2019/0365154 A1 Dec. 5, 2019

(51) Int. Cl.
*A47J 37/12* (2006.01)
*A47J 36/20* (2006.01)
(Continued)

(52) U.S. Cl.
CPC .......... *A47J 37/1271* (2013.01); *A47J 36/20* (2013.01); *A47J 37/1276* (2013.01);
(Continued)

(58) Field of Classification Search
CPC .. A47J 36/18; A47J 36/20–22; A47J 37/1271; A47J 37/1276; C04B 33/04;
(Continued)

(56) References Cited

U.S. PATENT DOCUMENTS 4,301,214 A * 11/1981 Crandall ................. C04B 33/13
428/446
5,053,092 A * 10/1991 Lachman ................ C04B 35/10
264/638
(Continued)

FOREIGN PATENT DOCUMENTS

CN 103396094 A 11/2013
CN 103496947 A 1/2014
(Continued)

OTHER PUBLICATIONS

Singh Hsiao, "Test of the Leachable Lead and Cadmium content from the pottery", SGS Test Report, Feb. 6, 2017, 3 pages, No. CT/2017/11096, SGS Taiwan Ltd., Taipei, Taiwan.

Primary Examiner — Sarang Afzali
Assistant Examiner — Darrell C Ford
(74) Attorney, Agent, or Firm — CIPO IP Group

(57) ABSTRACT

A ceramic deep-frying device capable of withstanding high temperatures and releasing far-infrared energy is made by grinding and mixing mullite, spodumene, energy ceramic material, ball clay, and kaolin clay into clay blank; molding the blank into ceramic green body; and sintering the green body at 1250-1320° C. for 18-24 hours. The device is completely immersed in the oil in a deep-frying vessel while leaving a gap between the device and heating pipe in the vessel or the inner bottom wall of the vessel, for enabling the oil to circulate through the through holes in the device due to temperature difference in the oil, causing the energy ceramic material to release anions and far-infrared rays that decrease van der Waals forces between oil molecules, and hence split, the oil molecules, thereby extending the service life of the oil, shortening the deep-frying time required, and lowering the oil content of deep-fried food.

12 Claims, 3 Drawing Sheets

(51) Int. Cl.
*C04B 33/32* (2006.01)
*C04B 33/13* (2006.01)
(52) U.S. Cl.
CPC ............ *C04B 33/131* (2013.01); *C04B 33/32* (2013.01); *C04B 2235/3217* (2013.01); *C04B 2235/602* (2013.01)
(58) Field of Classification Search
CPC .................. C04B 33/32; C04B 33/131; C04B 2235/3217; C04B 2235/602; C04B 2235/3248; C04B 2235/94; C04B 2235/3241; C04B 2235/3275; C04B 2235/3281; C04B 2235/3272; C04B 2235/3232; C04B 2235/3244; C04B 2235/3262; C04B 2235/6567; C04B 2235/3463; C04B 2235/3472; C04B 2235/349; C04B 35/64; C04B 35/185; C04B 35/19
See application file for complete search history.

(56) References Cited

U.S. PATENT DOCUMENTS

| | | | | |
|---|---|---|---|---|
| 10,954,169 | B2* | 3/2021 | Droz | C04B 35/64 |
| 2003/0111072 | A1* | 6/2003 | Takeda | A47J 27/002 126/391.1 |
| 2004/0045448 | A1* | 3/2004 | Abe | A47J 27/21025 99/403 |
| 2008/0057267 | A1* | 3/2008 | Brocheton | C04B 35/195 428/116 |
| 2008/0182743 | A1* | 7/2008 | Yildirum | C09C 3/006 501/141 |
| 2009/0205511 | A1* | 8/2009 | Tienor | A23L 5/11 99/403 |
| 2012/0316053 | A1* | 12/2012 | Francy | C04B 35/62665 501/32 |
| 2014/0227411 | A1* | 8/2014 | Popeil | A47J 37/1209 426/302 |
| 2015/0121827 | A1* | 5/2015 | Cai | C04B 35/185 55/523 |
| 2016/0100708 | A1* | 4/2016 | Shahrooz | A47J 27/002 99/325 |
| 2016/0135635 | A1* | 5/2016 | Boniello | A47J 27/004 99/403 |
| 2020/0046009 | A1* | 2/2020 | Hsu | C04B 35/19 |

FOREIGN PATENT DOCUMENTS

| | | |
|---|---|---|
| CN | 104261801 A | 1/2015 |
| CN | 104961439 A | 10/2015 |
| CN | 106380176 A | 2/2017 |

* cited by examiner

CERAMIC DEEP-FRYING DEVICE
CAPABLE OF WITHSTANDING HIGH
TEMPERATURES AND RELEASING
FAR-INFRARED ENERGY AND METHOD
FOR MAKING THE SAME

FIELD OF THE INVENTION

The present invention relates to a deep-frying device. More particularly, the invention relates to a ceramic deep-frying device that can withstand high temperatures and release anions and far-infrared energy. Once the ceramic deep-frying device is completely immersed in the cooking oil in a deep-frying vessel, the cooking oil can circulate repeatedly through the through holes in the ceramic deep-frying device from below the bottom side of the ceramic deep-frying device to above the top side of the ceramic deep-frying device or vice versa due to a temperature difference in the cooking oil, allowing the energy mineral and metal oxide in the ceramic deep-frying device to interact with each other under the high heat of the cooking oil and thereby release anions and far-infrared energy. The far-infrared energy can resonate with the oil molecules and thus decrease the van der Waals forces between oil molecule clusters instantly. As a result, large oil molecule clusters are broken into smaller ones, which contributes effectively to extending the service life of the cooking oil, shortening the deep-frying time required, and making healthier deep-fried food with a lower oil content.

BACKGROUND OF THE INVENTION

Deep-fried food is a major category of food supplied by the food service industries in many parts of the world, and is available in a great variety of options, for example, fried chicken, French fries, deep-fried pork cutlets, deep-fried fish fillets . . . etc. To ensure the quality and hygiene of deep-frying oil used in the food service industry in Taiwan, the Department of Health Executive Yuan of Taiwan has established the Deep-Frying Oil Inspection and Management Guidelines in 2009. According to which a food service provider found to be using deep-frying oil of 25% or higher "total polar compound" content will be dealt with in accordance with "Regulations on Good Hygiene Practice for Food", which was formulated pursuant to Article 20 of the Act Governing Food Safety and Sanitation. In addition, the Food and Drug Administration of Taiwan has been urging local (county and city) public health bureaus to conduct sampling inspection on deep-frying oil used in the food service industry, has initiated and carried out the "Project for Analyzing the Hygiene and Hazards of Commercially Available Deep-Frying Oil for Use in Food Preparation" in order to monitor the "total polar compound" content of deep-frying oil used by food service providers; the Administration has compiled and printed the "Simplified Manual for Deep-Frying Oil Safety Management" in order for food service providers to understand the principles by which the sanitation authorities perform sampling inspection on deep-frying oil, the inspection methods, and the managerial standards, and also for the sanitation management personnel to have a quick reference guide when inspecting the sanitation conditions of food service providers, the ultimate goal being to help food service providers establish standard operation procedures for self-management of deep-frying oil, and to thereby enhance the quality, hygiene, and safety of deep-frying oil in Taiwan effectively.

Deep-frying is a quick and simple cooking method favored by the general public because it imparts not only a crispy texture but also a unique aroma to food. However, the oil used for deep-frying tends to have chemical reaction with the food being deep-fried, moisture, oxygen in the air, and so on while serving as a heat conducting medium. More particularly, the moisture in the food being deep-fried will evaporate under high heat and thus enter the deep-frying oil, causing hydrolysis of the oil. Deep-frying oil will also oxidize due to oxygen in the ambient air and undergo a thermal reaction when reaching a high temperature such that the polyunsaturated fatty acids in the oil deteriorate because of heat. All these complicated reactions lead to degradation of deep-frying oil, and new substances known collectively as "total polar compounds" are generated as a result. The total polar compounds in a pan of deep-frying oil that has been used for a long time will accelerate deterioration of the deep-frying oil, giving the oil a dark color, a bubbly consistency, and a rancid smell, regardless of the type of the oil. The more the products of deterioration, the lower the quality of the deep-fried food, as demonstrated by, for example, the large amount of oil absorbed, an oily mouthfeel, a lack of crunchiness, an overly dark color, and a strong rancid smell. Deteriorated deep-frying oil not only compromises the looks and texture of deep-fried food, but also raises significant health concerns because it permeates the food deep-fried therein.

The issue to be addressed by the present invention is to design a device that can be used in a deep-frying vessel (e.g., a gas-heated or electrically heated deep fryer for commercial use or a conventional metal pan) to effectively extend the service life of the deep-frying oil in the deep-frying vessel, shorten the time required for deep frying, lower the oil content of the resulting deep-fried food, and thereby enhance the cooking efficiency, quality, hygiene, and safety of the deep-fried food.

BRIEF SUMMARY OF THE INVENTION

The primary objective of the present invention is to provide a ceramic deep-frying device capable of withstanding high temperatures and releasing anions and far-infrared energy and a method for making the same. To make the ceramic deep-frying device, the first step is to grind mullite (constituting 20%-40% by weight of the ceramic deep-frying device), spodumene (constituting 25%-45% by weight of the ceramic deep-frying device), and an energy ceramic material capable of generating anions and far-infrared rays (constituting 10%-30% by weight of the ceramic deep-frying device) separately into particles. Next, all the particles are mixed with ball clay (constituting 10%-25% by weight of the ceramic deep-frying device) and kaolin clay (constituting 15%-30% by weight of the ceramic deep-frying device) until they are well blended and form a clay blank. A mold is then used to shape the clay blank into a three-dimensional or planar ceramic green body. The ceramic green body is provided with a plurality of through holes, and the bottom side of the ceramic green body (i.e., of the completed ceramic deep-frying device) is configured to be positioned either on the outer wall of a heating pipe in a deep-frying vessel or on the inner bottom wall of the deep-frying vessel while leaving a predetermined gap between the bottom side of the ceramic green body (i.e., of the completed ceramic deep-frying device) and the outer wall of the heating pipe or the inner bottom wall of the deep-frying vessel. The ceramic green body is subsequently sintered at 1250-1320° C. for 18-24 hours to produce a sintered product, which, when cooled, is the completed ceramic deep-frying device.

Once the ceramic deep-frying device is completely immersed in the cooking oil in the deep-frying vessel and is positioned on the outer wall of the heating pipe or the inner bottom wall of the deep-frying vessel, the cooking oil can circulate repeatedly through the through holes in the ceramic deep-frying device from below the bottom side of the ceramic deep-frying device to above the top side of the ceramic deep-frying device or vice versa due to a temperature difference in the cooking oil, thanks to the predetermined gap between the bottom side of the ceramic deep-frying device and the outer wall of the heating pipe or the inner bottom wall of the deep-frying vessel. While the circulation takes place, the energy mineral and metal oxide in the ceramic deep-frying device can react with each other under the high heat of the cooking oil and thereby release anions and far-infrared rays, which resonate with the oil molecules. As a result, the van der Waals forces between oil molecule clusters are instantaneously decreased, and large oil molecule clusters are therefore split into smaller ones, allowing the contaminants harbored in those large oil molecule clusters to be removed. Thus, the cooking oil can be purified and have its service life effectively extended two- to threefold. The relatively small oil molecule clusters also substantially increase the area through which the food being deep-fried can absorb heat from the cooking oil, so the food can be heated faster and more evenly. To be specific, the time required for deep-frying can be effectively shortened by 10%-25%. Also, the oil content of the resulting deep-fried food will be 30%-50% lower than conventionally allowed and hence lead to a crispy texture due to the fact that the relatively small oil molecule clusters can discharge rapidly from the deep-fried food. The ceramic deep-frying device, therefore, can effectively purify cooking oil, extend the service life of cooking oil, shorten the time required for deep frying, and lower the oil content of deep-fried food. The aforesaid effects not only are eco-friendly (i.e., saving energy and reducing carbon dioxide emissions), but also provide significant improvement on the safety and healthiness of deep-fried food.

BRIEF DESCRIPTION OF THE SEVERAL VIEWS OF THE DRAWINGS

The structural features, manufacturing method, and objectives of the present invention can be better understood by referring to the following detailed description in conjunction with the accompanying drawings, in which.

DETAILED DESCRIPTION OF THE INVENTION

The oil molecule clusters in cooking oil tend to gather together due to the van der Waals forces therebetween, forming relatively large oil molecule clusters. These relatively large oil molecule clusters not only may harbor contaminants, but also result in a notable reduction in the heated area of the food being cooked with the oil. That is to say, the food will be heated unevenly, with thermal energy accumulating in certain parts of the food rather than spreading evenly throughout. More importantly, once relatively large oil molecule clusters seep into food through deep frying, it is difficult to remove the clusters from the deep-fried food; in other words, the deep-fried food is susceptible to excessive oil absorption, an oily mouthfeel, and insufficient crispiness, among other issues. In view of this, the inventor of the present invention came up with the idea of designing a deep-frying device to be immersed completely in the cooking oil in a deep-frying vessel (e.g., a gas-heated or electrically heated deep fryer for commercial use or a conventional metal pan) so that, while deep frying takes place, the temperature difference in the cooking oil enables repeated circulation of the cooking oil around the deep-frying device and thereby causes the deep-frying device to release energy under the high heat of the cooking oil, wherein the energy can resonate with the oil molecules and thus decrease the van der Waals forces between oil molecule clusters instantly, breaking large oil molecule clusters into smaller ones so as to extend the service life of the cooking oil, shorten the time required for deep frying, lower the oil content of the resulting deep-fried food, and hence effectively enhance the cooking efficiency, quality, hygiene, healthiness, and safety of the deep-fried food.

Figure 1:
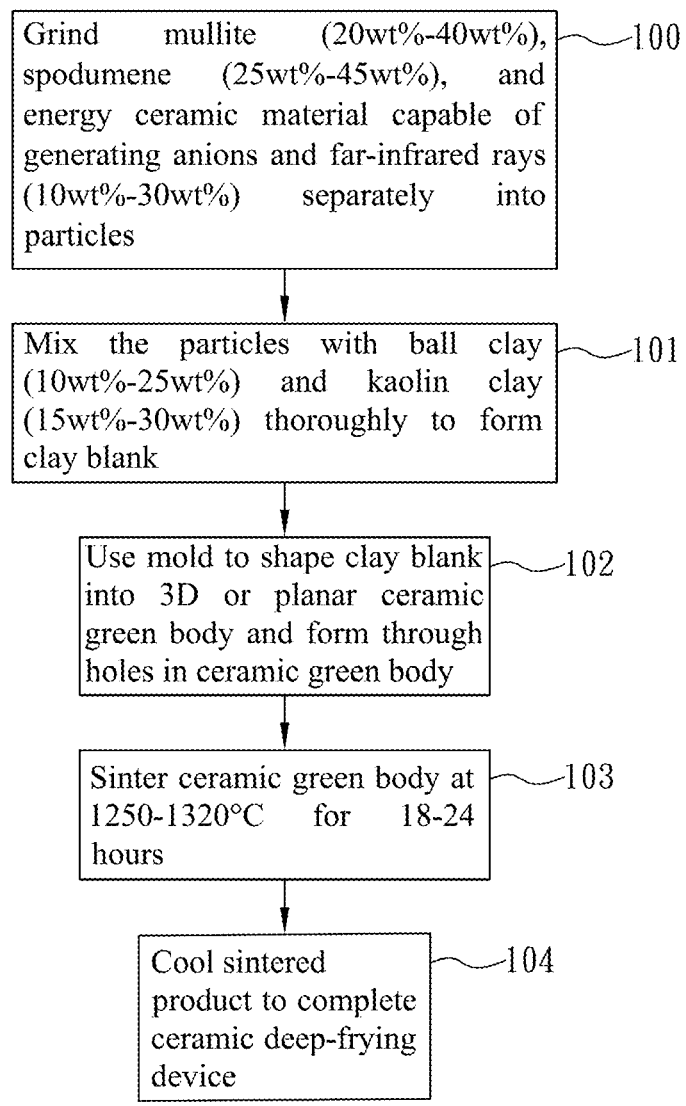
FIG. 1 is the flowchart of a manufacturing method according to the invention.

The present invention provides a method for making a ceramic deep-frying device capable of withstanding high temperatures and releasing anions and far-infrared energy. The method includes the following steps as shown in FIG. 1.

(100) To begin with, mullite, which makes up 20%-40% of the total weight of the ceramic deep-frying device; spodumene (or spodumenite), which makes up 25%-45% of the total weight of the ceramic deep-frying device; and an energy ceramic material capable of generating anions and far-infrared rays, which makes up 10%-30% of the total weight of the ceramic deep-frying device, are separately ground into particles, with particle sizes ranging from 50 to 400 im. Mullite is an aluminum silicate resistant to high heat and featuring high strength, low thermal conductivity, and a remarkable energy-saving effect. Moreover, mullite is a superior refractory material that can be brought into direct contact with flames. Here, mullite is used mainly to increase the structural strength of the ceramic deep-frying device in a high-temperature state and to effectively lower the heat-accumulating ability of the ceramic deep-frying device lest a large amount of heat accumulate therein. Spodumene is composed of $LiAl(SiO_3)_2$ or $Li_2O.Al_2O_3.4SiO_2$, is typically found in granite pegmatite rich in lithium, can coexist with tourmaline, and is highly transparent. Both mullite and spodumene are low-expansion materials capable of withstanding high temperatures. The energy ceramic material is composed of an energy mineral and a metal oxide. The energy mineral is a mixture at least of tourmaline, dolomite, and zirconium silicate and makes up 5%-25% of the total weight of the ceramic deep-frying device, with tourmaline being the major ingredient. Tourmaline is a silicate that contains mostly boron but also such elements as aluminum, sodium, iron, magnesium, and lithium. Polar crystals of tourmaline contain more than ten trace elements, can generate electric ions on their own for a long time, and can release anions and far-infrared rays permanently. Dolomite has the chemical formula of $CaMg(CO_3)_2$, whose crystals are a carbonate of the trigonal crystal system. Here, dolomite is used mainly to provide alkali-based fire retardancy. More particularly, when dolomite is heated to (or sintered at) a temperature higher than 1000° C., the magnesium oxide therein will transform into periclase, and the calcium oxide therein, into crystals of a compact structure and high water resistance, thereby rendering the entire ceramic deep-frying device resistant to temperatures higher than 2000° C. Zirconium silicate has the chemical formula of $ZrSiO_4$, has stable chemical properties, and is resistant to high heat and highly transparent. The metal oxide is an iron oxide, cobalt oxide, manganese oxide, chromic oxide, thorium oxide, zirconium oxide, titanium oxide, copper oxide, or a mixture of the above and also makes up 5%-25% of the total weight of the ceramic deep-frying device. Here, the metal oxide serves mainly as a catalyst for inducing the energy mineral in the ceramic deep-frying device to release anions and far-infrared energy in a high-temperature environment.

(101) The particles obtained from step (100) are added with ball clay, which makes up 10%-25% of the total weight of the ceramic deep-frying device, and kaolin clay, which makes up 15%-30% of the total weight of the ceramic deep-frying device. Then, the three of them go through a mixing process until they are well blended and form a clay blank. Ball clay is composed of kaolinite and is a plastic clay mixed with quartz, mica, and organic impurities in certain percentages. Due to its high plasticity, ball clay is often used to improve the formability of blanks. In a clay blank, however, ball clay should be used only moderately. Kaolin clay is composed mainly of kaolinite-based clay minerals and is a common and very important clay in nature. Pure kaolin clay looks like white, smooth, and fluffy soil and has such desirable physical and chemical properties as high plasticity and high fire retardancy. The mixing process is carried out mechanically to blend the ingredients of the clay blank evenly and thereby enhance the physical and mechanical properties of the clay blank. More specifically, the mixing process includes four stages: addition, dispersion, blending, and plasticization, in that order. The four stages are intended to effectively achieve even distribution of each ingredient throughout the clay blank and to lower overall viscosity.

(102) The clay blank is shaped into a three-dimensional or planar ceramic green body by means of a mold. The ceramic green body is provided with a plurality of through holes. The bottom side of the ceramic green body (i.e., of the completed ceramic deep-frying device) is configured to be positioned either on the outer wall of a heating pipe in a deep-frying vessel or on the inner bottom wall of the deep-frying vessel while leaving a predetermined gap between the bottom side of the ceramic green body (i.e., of the completed ceramic deep-frying device) and the outer wall of the heating pipe or the inner bottom wall of the deep-frying vessel.

(103) The ceramic green body is sintered at 1250-1320° C. for 18-24 hours to produce a sintered product.

(104) The sintered product is cooled to complete the manufacture of the ceramic deep-frying device.

Figure 2:
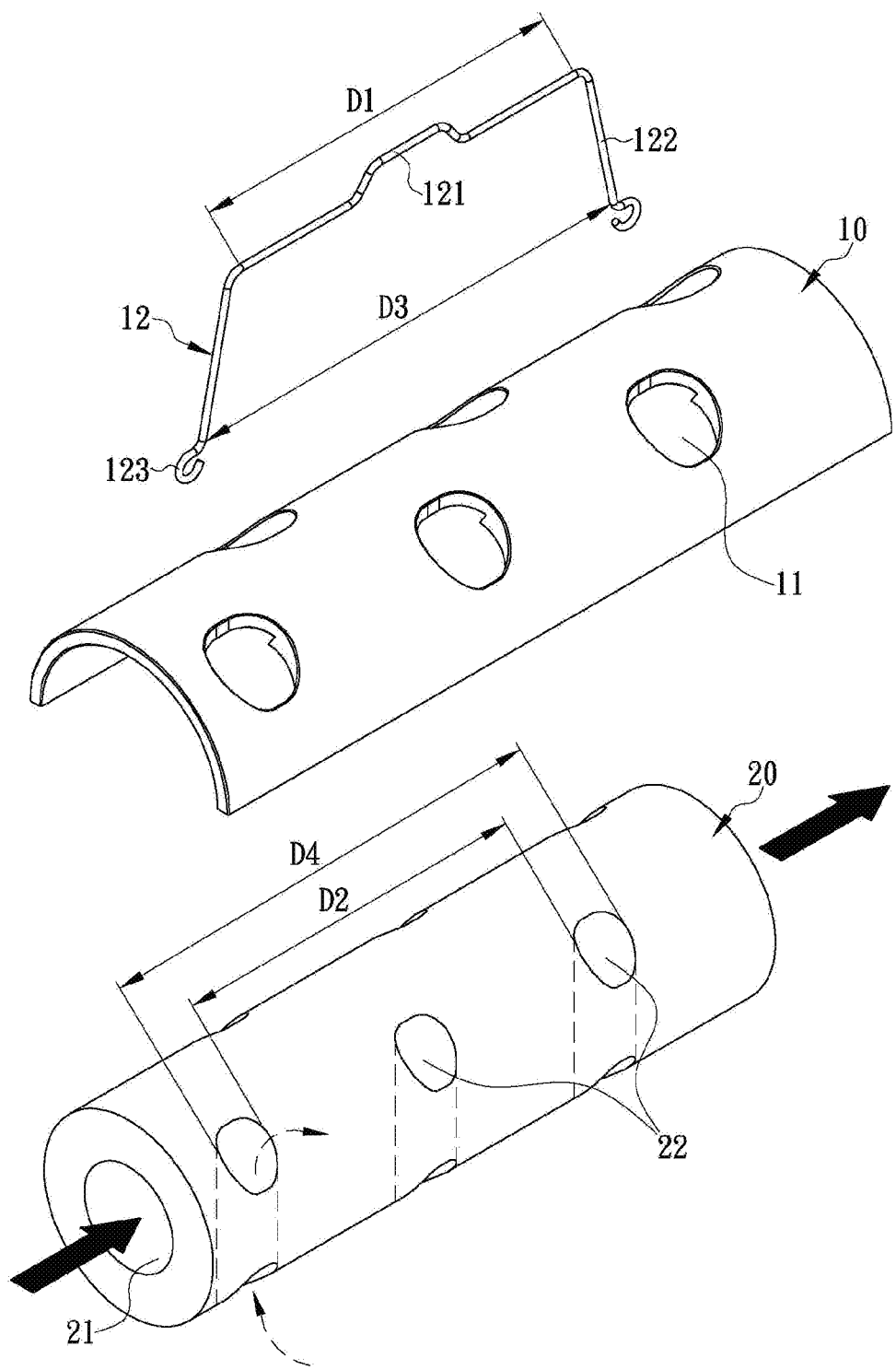
FIG. 2 is a perspective view of the three-dimensional ceramic deep-frying device according to a preferred embodiment of the invention.

According to a preferred embodiment of the present invention, referring to FIG. 2, the ceramic deep-frying device 10 is configured for use with a commercially available gas-heated or electrically heated deep fryer for commercial use (not shown). Typically, such a commercial deep fryer has a cuboid interior and is fixedly and horizontally provided therein with a plurality of parallel heating pipes 20. The heat generated by gas or electrically is transferred by convection from one end to the opposite end of the heating channel 21 in each heating pipe 20 (indicated by the bold arrows in FIG. 2) in order for the heating pipes 20 to heat the cooking oil in the deep fryer, wherein the heating pipes 20 must be immersed completely in the cooking oil. Each heating pipe 20 is provided with a plurality of oil passageways 22 that extend vertically and are arranged at intervals. Each oil passageway 22 is in communication with the cooking-oil storage space in the deep fryer but is not in communication with the corresponding heating channel 21. The ceramic deep-frying device 10 in FIG. 2 has a three-dimensional shape and is provided with a plurality of through holes 11. The bottom side of the ceramic deep-frying device 10 is configured to be positioned on the top side of the outer wall of any heating pipe 20 in such a way that a predetermined gap is formed between the bottom side of the ceramic deep-frying device 10 and the top side of the outer wall of the heating pipe 20, and that each through hole 11 corresponds to one of the oil passageways 22 of the heating pipe 20.

When the ceramic deep-frying device 10 is positioned as described above and deep frying begins, cooking oil can circulate repeatedly through the through holes 11 in the ceramic deep-frying device 10 from below the bottom side of the ceramic deep-frying device 10 to above the top side of the ceramic deep-frying device 10 or vice versa because of a temperature difference in the cooking oil. The circulation drives the cooking oil to flow through the oil passageways 22 (as indicated by the dash-lined arrow in FIG. 2) at higher speed so that the cooking oil is heated faster. The high heat of the cooking oil also causes the energy mineral and metal oxide in the ceramic deep-frying device 10 to interact with each other and thus release anions and far-infrared energy. The far-infrared energy can resonate with the oil molecules such that the van der Waals forces between oil molecule clusters are reduced at once, thereby breaking large oil molecule clusters into smaller ones, allowing the contaminants harbored in the large oil molecule clusters to be removed. The cooking oil can be thus purified and have its service life effectively extended two- to threefold. Moreover, as the relatively small oil molecule clusters lead to a significant increase of the heat-absorbing area of the food being deep-fried, faster and more even heating can be achieved. Not only can the deep-frying time be effectively shortened by 10%-25%, but also the even penetration of heat prevents peroxidation, splitting, and deterioration of the cooking oil. Once the deep-frying process is completed, the relatively small oil molecule clusters can discharge rapidly from the deep-fried food to reduce the oil content of the deep-fried food by 30%-50% as compared with that resulting from a conventional deep-frying setting, allowing the deep-fried food to have a crispy rather than oily mouthfeel. More importantly, now that the cooking oil is less likely to oxidize and deteriorate, the safety and healthiness of deep frying and the resulting deep-fried food are greatly enhanced. According to the above, the ceramic deep-frying device 10 disclosed herein can effectively purify cooking oil, extend the service life of cooking oil, shorten the time required for deep frying, and lower the oil content of deep-fried food. The ceramic deep-frying device 10, therefore, is eco-friendly (by helping to save energy and reduce carbon dioxide emissions) and can substantially improve the safety and healthiness of deep-fried food.

To ensure that the ceramic deep-frying device of the present invention does not generate harmful substances during use, the inventor commissioned Société Générale de Surveillance (SGS) Taiwan Limited to test the ceramic deep-frying device 10 according to applicable specifications of the Food and Drug Administration (FDA) of the USA, in order to find out whether the ceramic deep-frying device 10 releases such harmful substances as lead and chromium under high heat. The SGS test results (see attachment) show that the ceramic deep-frying device 10 did not generate or release lead, chromium, or any other harmful substances. A "SGS Test Report" dated Feb. 6, 2017 mentioned in the IDS submitted with this application is being incorporated by reference.

Apart from the issue of food safety, the inventor verified the efficacy of the ceramic deep-frying device 10 by studying, analyzing, and comparing deep-fried food prepared with a "deep fryer provided with the ceramic deep-frying device 10" (hereinafter referred to as the product of the present invention) and that prepared with a "conventional deep fryer without the ceramic deep-frying device 10" (hereinafter referred to as the conventional product), wherein the deep-fried food was deep-fried chicken legs. After deep frying for an extended period of time, the cooking oil in the product of the present invention maintained a golden color, did not smell rancid, had relatively low viscosity, and was still capable of sealing the chicken legs, whereas the cooking oil in the conventional product had a charred color and noticeable rancid smell, became viscous, and produced relatively dry chicken meat. The cooking oil in the product of the present invention did not rancidify until after 60 hours of deep frying, but the cooking oil in the conventional product turned rancid after only 48 hours.

Besides, the quality of the cooking oil in the product of the present invention and in the conventional product was examined after heating the oil to 180° C. and maintaining that temperature for 72 hours. The differences in quality can be clearly seen in the following table (in which the "red value" refers to an oil color measurement taken with a Lovibond Tintometer):

| Test item | Conventional product | Product of the present invention | Difference (%) |
|---|---|---|---|
| Acid value | High | Low | 30 |
| Peroxide number | High | Low | 50 |
| Red value | High | Low | 34 |
| Dielectric constant | High | Low | 28 |
| Viscosity | High | Low | 32 |
| Total color difference | High | Low | 45 |
| Fatty acids | High | Low | 45 |

Referring back to FIG. 2, the ceramic deep-frying device 10 according to this embodiment can be easily and rapidly fixed on the heating pipe 20 in the deep fryer through at least one elastic clip 12. As shown in FIG. 2, the elastic clip 12 includes a connecting member 121 and two gripping members 122. The length D1 of the connecting member 121 matches the distance D2 between the corresponding inner edges of two oil passageways 22. Each gripping member 122 has one end connected to one end of the connecting member 121 and the opposite end (hereinafter referred to as the second end) extending away from the connecting member 121. The distance D3 between the second ends of the gripping members 122 is greater than the distance D4 between the corresponding outer edges of the aforesaid two oil passageways 22. To install the ceramic deep-frying device 10, the user begins by bending the gripping members 122 toward each other. Then, each gripping member 122 is inserted into one of the two oil passageways 22 through the corresponding through hole 11 of the ceramic deep-frying device 10 and one end of the oil passageway 22. The bending force is subsequently released, allowing the second ends of the gripping members 122 to be pressed respectively and tightly against the walls of the two oil passageways 22 by the elastic restoring force of the gripping members 122, thereby fixing the ceramic deep-frying device 10 to the heating pipe 20.

In this embodiment, the lengths of the gripping members 122 are greater than those of the two oil passageways 22, and the second end of each gripping member 122 is further provided with a protruding portion 123 (e.g., a protruding ring). After the gripping members 122 are passed sequentially and respectively through the corresponding through holes 11 and the two oil passageways 22, the protruding portions 123 are pressed respectively against certain portions of the heating pipe 20 that are respectively adjacent to the opposite ends of the two oil passageways 22 to further secure the ceramic deep-frying device 10.

Figure 3:
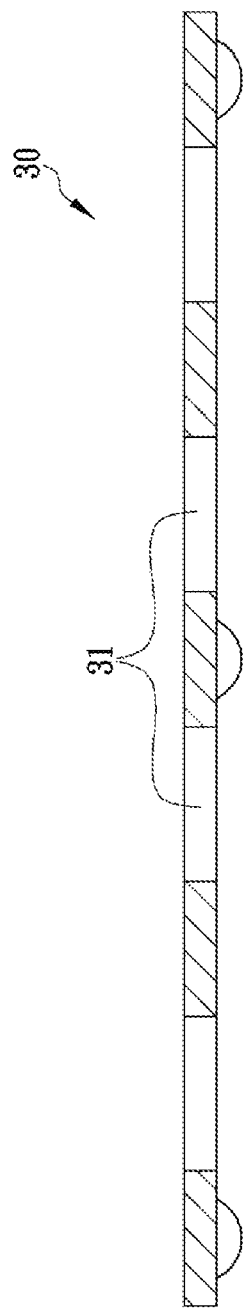
FIG. 3 is a sectional view of the planar ceramic deep-frying device according to another preferred embodiment of the invention.

The embodiment described above is only a preferred one of the present invention. One who tries to implement the invention may modify the embodiment as needed. For example, FIG. 3 shows a ceramic deep-frying device 30 for use with a conventional flat-bottomed (or curved-bottomed) metal pan. Such a conventional metal pan is not equipped with the foregoing heating pipes, so the ceramic deep-frying device 30, which is designed for use with a flat-bottomed metal pan, has a planar shape and is designed to be put directly on the inner bottom wall of the flat-bottomed metal pan before deep frying. Please note that the bottom side of the ceramic deep-frying device 30 is configured (e.g., provided with a plurality of supporting points) to create a predetermined gap between itself and the inner bottom wall of the flat-bottomed metal pan so that, during the deep-frying process, cooking oil can circulate repeatedly through the through holes 31 in the ceramic deep-frying device 30 from below the bottom side of the ceramic deep-frying device 30 to above the top side of the ceramic deep-frying device 30 or vice versa because of a temperature difference in the cooking oil, thereby achieving the aforementioned effects (i.e., to effectively purify the cooking oil, extend the service life of the cooking oil, shorten the time required for deep frying, and lower the oil content of deep-fried food) just as well.

While the invention herein disclosed has been described by means of specific embodiments, numerous modifications and variations could be made thereto by those skilled in the art without departing from the scope of the invention set forth in the claims.

What is claimed is:

1. A ceramic deep-frying device capable of withstanding high temperatures and releasing anions and far-infrared energy, comprising:

a sintered product forming the ceramic deep-frying device and made by sintering a ceramic green body of a three-dimensional or planar shape at 1250-1320° C. for 18-24 hours, wherein the ceramic green body is prepared by mixing ball clay, at 10%-25% by weight of the ceramic deep-frying device, kaolin clay, at 15%-30% by weight of the ceramic deep-frying device, mullite particles, at 20%-40% by weight of the ceramic deep-frying device, spodumene particles, at 25%-45% by weight of the ceramic deep-frying device, and energy ceramic particles capable of generating anions and far-infrared rays, at 10%-30% by weight of the ceramic deep-frying device, and the ceramic deep-frying device has a bottom side configured to be positioned either on an outer wall of a heating pipe in a deep-frying vessel or on an inner bottom wall of the deep-frying vessel while leaving a predetermined gap between the bottom side of the ceramic deep-frying device and the outer wall of the heating pipe or the inner bottom wall of the deep-frying vessel; and a plurality of through holes provided in the ceramic deep-frying device, wherein each said through hole opens at both a top side and the bottom side of the ceramic deep-frying device so that cooking oil is able to circulate repeatedly through the through holes from below the bottom side of the ceramic deep-frying device to above the top side of the ceramic deep-frying device or vice versa due to a temperature difference in the cooking oil.

2. The ceramic deep-frying device of claim 1, wherein the mullite particles, the spodumene particles, and the energy ceramic particles are of sizes ranging from 50 to 400 im.

3. The ceramic deep-frying device of claim 2, wherein the energy ceramic particles are composed of an energy mineral, at 5%-25% by weight of the ceramic deep-frying device, and a metal oxide, also at 5%-25% by weight of the ceramic deep-frying device.

4. The ceramic deep-frying device of claim 3, wherein the energy mineral is a mixture at least of tourmaline, dolomite, and zirconium silicate.

5. The ceramic deep-frying device of claim 4, wherein the metal oxide is an iron oxide, cobalt oxide, manganese oxide, chromic oxide, thorium oxide, zirconium oxide, titanium oxide, copper oxide, or a mixture thereof.

6. The ceramic deep-frying device of claim 5, wherein the heating pipe is provided with a plurality of oil passageways, and the oil passageways extend vertically, are arrange at intervals, correspond respectively to the through holes, and are in communication with a space in the deep-frying vessel that contains the cooking oil, the ceramic deep-frying device further comprising: at least one elastic clip comprising a connecting member and two gripping members, wherein the connecting member has a length matching the distance between corresponding inner edges of two said oil passageways, each said gripping member has an end connected to an end of the connecting member and an opposite second end extending away from the connecting member, the distance between the second ends of the gripping members being greater than the distance between corresponding outer edges of the two oil passageways, the gripping members are able to be bent toward each other and then inserted respectively into the two oil passageways through corresponding said through holes and one ends of the two oil passageways, and once the gripping members are inserted into the two oil passageways respectively, the second ends of the gripping members are pressed respectively and tightly against walls of the two oil passageways by an elastic restoring force of the gripping members, thereby fixing the ceramic deep-frying device to the heating pipe.

7. The ceramic deep-frying device of claim 6, wherein each said gripping member has a greater length than each of the two oil passageways, the second end of each said gripping member is further provided with a protruding portion, and after the gripping members are inserted respectively and sequentially through the corresponding through holes and the two oil passageways, the protruding portions are pressed respectively against portions of the heating pipe that are respectively adjacent to opposite ends of the two oil passageways.

8. The ceramic deep-frying device of claim 1, wherein the energy ceramic particles are composed of an energy mineral, at 5%-25% by weight of the ceramic deep-frying device, and a metal oxide, also at 5%-25% by weight of the ceramic deep-frying device.

9. The ceramic deep-frying device of claim 8, wherein the energy mineral is a mixture at least of tourmaline, dolomite, and zirconium silicate.

10. The ceramic deep-frying device of claim 9, wherein the metal oxide is an iron oxide, cobalt oxide, manganese oxide, chromic oxide, thorium oxide, zirconium oxide, titanium oxide, copper oxide, or a mixture thereof.

11. The ceramic deep-frying device of claim 10, wherein the heating pipe is provided with a plurality of oil passageways, and the oil passageways extend vertically, are arranged at intervals, correspond respectively to the through holes, and are in communication with a space in the deep-frying vessel that contains the cooking oil, the ceramic deep-frying device further comprising: at least one elastic clip comprising a connecting member and two gripping members, wherein the connecting member has a length matching the distance between corresponding inner edges of two said oil passageways, each said gripping member has an end connected to an end of the connecting member and an opposite second end extending away from the connecting member, the distance between the second ends of the gripping members being greater than the distance between corresponding outer edges of the two oil passageways, the gripping members are able to be bent toward each other and then inserted respectively into the two oil passageways through corresponding said through holes and one ends of the two oil passageways, and once the gripping members are inserted into the two oil passageways respectively, the second ends of the gripping members are pressed respectively and tightly against walls of the two oil passageways by an elastic restoring force of the gripping members, thereby fixing the ceramic deep-frying device to the heating pipe.

12. The ceramic deep-frying device of claim 11, wherein each said gripping member has a greater length than each of the two oil passageways, the second end of each said gripping member is further provided with a protruding portion, and after the gripping members are inserted respectively and sequentially through the corresponding through holes and the two oil passageways, the protruding portions are pressed respectively against portions of the heating pipe that are respectively adjacent to opposite ends of the two oil passageways.

* * * * *